United States Patent [19]

Pittman

[11] Patent Number: 5,451,019
[45] Date of Patent: Sep. 19, 1995

[54] FASTENER FOR METAL STUDS

[76] Inventor: Richard Pittman, 113 Royal Cove Dr., Naples, Fla. 33963

[21] Appl. No.: 223,109

[22] Filed: Apr. 5, 1994

[51] Int. Cl.⁶ .................................................. F16L 3/00
[52] U.S. Cl. .................................... 248/74.1; 248/71; 248/73
[58] Field of Search .................... 248/74.1, 74.2, 73, 248/71, 316.7, 505, 500; 411/913; 24/551

[56] References Cited

U.S. PATENT DOCUMENTS

| | | | |
|---|---|---|---|
| 1,884,036 | 10/1932 | Malone | 248/74.1 |
| 2,354,404 | 7/1944 | Sayles | 211/113 |
| 2,767,946 | 10/1956 | Weeks | 248/50 |
| 3,041,025 | 6/1962 | Daly | 248/74 |
| 3,848,840 | 11/1974 | Umezu | 248/73 |
| 5,150,865 | 9/1992 | Miller | 248/71 |

Primary Examiner—Leslie A. Braun
Assistant Examiner—Anita M. King
Attorney, Agent, or Firm—Merrill N. Johnson

[57] ABSTRACT

A fastener for holding or securing a length of electrical conduit, cable or pipe against the flat center panel of a metal stud whose center panel contains a series of spaced apart holes. The fastener includes an elongated helically coiled metal spring whose midportion is axially positioned within a cylindrical retainer of rubber-like plastic material. The length of the coiled spring is about twice the width of the holes in the metal stud and the length of the cylindrical retainer is about half that of the coiled spring. The pipe to be secured is positioned over a hole in the stud, the fastener is pinched into a U shape surrounding the pipe and the opposite ends of the coiled spring are inserted into the hole in the stud. When the tension on the pinched fastener is released, the spring will be locked into the hole in the stud and the pipe will be firmly secured against the center panel of the stud.

4 Claims, 1 Drawing Sheet

FASTENER FOR METAL STUDS

BACKGROUND AND SUMMARY OF THE INVENTION

The invention lies in the field of fasteners and in particular devices for fastening or holding a length of electrical conduit or pipe firmly against the wall of a metal stud.

Galvanized metal studs are extensively used in the construction of residential and commercial buildings to replace wooden two by fours traditionally used as vertical studs in the building's walls. The metal studs are U-shaped in cross-section with a series of spaced apart holes in the flat center panel of the stud.

It is often required that a length of electrical conduit or pipe for water or gas be firmly secured against the surface of the metal stud. Although various means for securing a length of conduit or pipe or cable to a metal stud have been suggested, no simple, reliable and inexpensive device has as yet appeared on the market.

I have invented a device which simply and reliably will fasten or hold a length of conduit or pipe or cable against the flat center panel of a vertical metal stud. The device is both inexpensive to make and quick and easy to install.

The device consists of two separate elements, each readily available and easy to join together into my unique fastener. The first element is a coiled metal spring preferably having a length about twice the width of the punched out holes in the metal stud. The second element is a cylindrical retainer of rubber-like foamed plastic material axially surrounding the center portion of the coiled metal spring and having a diameter about three times that of the helical spring and a length about one half that of the helically coiled metal spring.

When it is desired to fasten a length of electrical conduit or pipe against the center panel of a vertical metal stud, the conduit or pipe is first pressed against the center of the stud and then thee opposite ends of the cylindrical retainer of one of my fasteners are pinched together around the length of conduit or pipe and the opposite ends of the coiled spring are inserted into one of the holes in the metal stud. Then when the tension on the ends of the retainer are released, the coils of the spring will lock onto the metal stud and retain the length of conduit or pipe or cable firmly against the flat wall of the metal stud.

BRIEF DESCRIPTION OF THE DRAWINGS

The appended drawings are intended to fully illustrate my unique fastner in which.

DETAILED DESCRIPTION OF A PREFERRED FORM OF MY FASTENER

Figure 1:
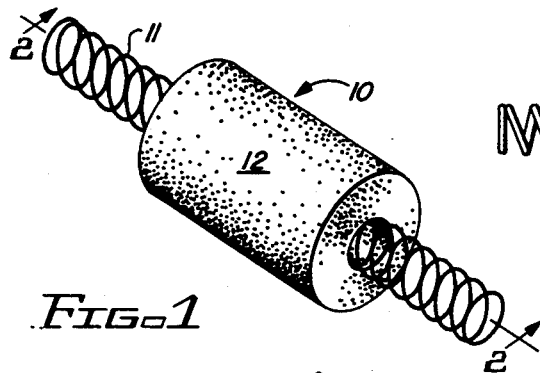
FIG. 1 is a perspective view of a preferred form of my fastener.
Figure 2:
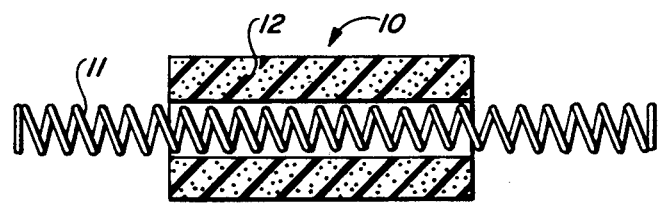
FIG. 2 is a cross-sectional view of my fastener taken along line 2—2 of FIG. 1.

Referring first to FIGS. 1 and 2 of the drawings, fastener 10 is a preferred form of my fastener. Fastener 10 consists of two elements, the first being a coiled helical spring 11 having a length approximately twice the width of the punched out holes in the metal stud. Spring 11 is made of metal and preferably has a length of 4 inches and an outside diameter of ⅜ths of an inch, made of 18 gauge coiled galvanized steel wire.

The second element is a cylinder 12 of rubber-like plastic material having a length about one half that of coiled spring 11 and an outside diameter about three times that of the spring. Preferably cylinder 12 is hollow with an inside diameter slightly less than the outside diameter of spring 11, with the cylinder centered over the length of the spring. A cylinder made from a foamed closed cell tubular product conventionally used to insulate air conditioning lines made of acrylonitrile budiene and called nitrile/pvc works very well and is preferred.

Figure 3:
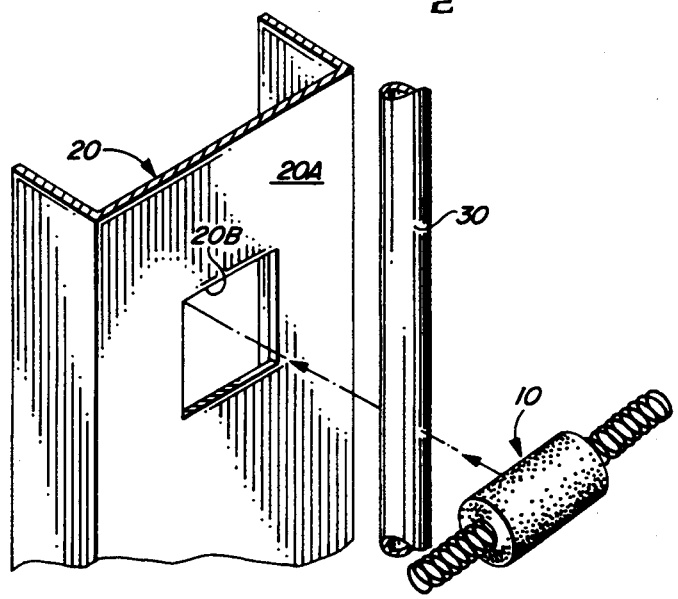
FIG. 3 is perspective view of a typical U-shaped metal stud, a conventional length of pipe and the fastener shown in FIGS. 1 and 2.
Figure 4:
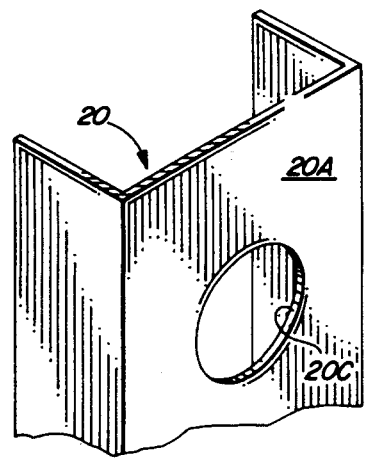
FIG. 4 is another form of metal stud having circular punched out holes rather than the square holes shown in FIG. 3.

FIGS. 3 and 4 illustrate two forms of conventional metal studs 20, each being U-shaped and having a flat center panel 20A. In FIG. 3 the holes 20B in center panel 20A are essentially square, while in FIG. 4 the holes 20C are circular.

Figure 5:
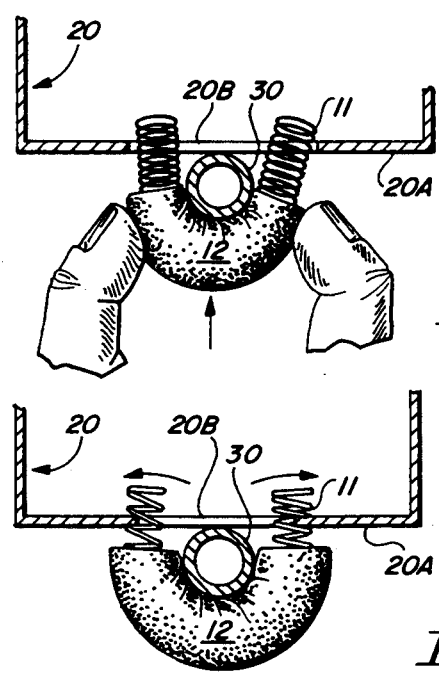
FIG. 5 illustrates the method of installing one of my fastners into a metal stud.
Figure 6:
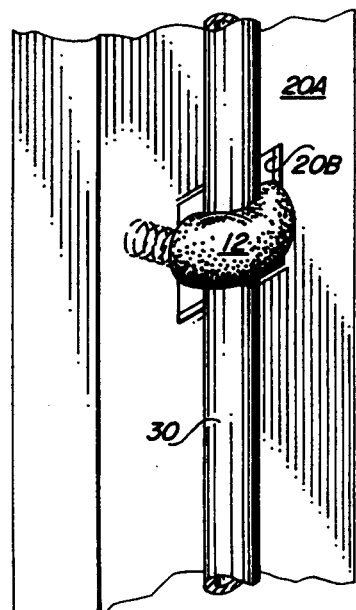
FIG. 6 illustrates my fastener installed into the hole in a metal stud and holding a length of pipe firmly against the metal stud.

FIGS. 3, 5 and 6 illustrate the successive steps by which my fastener 10 is used to firmly fasten or retain a length of pipe 30 (or a length of electrical conduit or cable) against the center panel 20A of metal stud 20.

FIG. 3 shows the vertical length of pipe 30 being placed against the center of the flat center panel 20A of the stud and the center of fastener 10 being pressed against pipe 30.

FIG. 5 shows the fastener being pinched into a U-shaped position by the thumb and a finger pressed against the opposite ends of the fastener's cylindrical retainer 12 and the ends of spring 11 being inserted into hole 20B of the stud.

FIG. 6 shows the position of the fastener when the tension of the pinching thumb and finger are released. The coils of the spring will be locked into the opposite edges of hole 20B, thus firmly fastening the length of pipe 30 against the flat wall of center panel 20A of the metal stud. Additional fasteners 10 can be inserted in a similar manner into other holes spaced along the length of the stud to further secure the entire length of pipe 30 against the entire length of stud 20 as desired.

Figure 7:
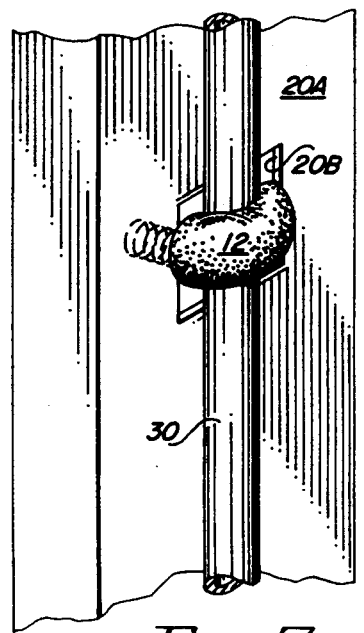
FIG. 7 is a perspective view of my fastener locked into a metal stud and holding a length of pipe against the stud.

FIG. 7 is a front perspective view of one of my fasteners being used to secure pipe 30 against the center panel 20A of the stud.

While I have illustrated and described my fastener for securing a length of conduit, pipe or cable against a metal stud, modifications and changes in the form of my fastener will become apparent to those skilled in the art. However, no limitation of the spirit and scope of my invention should be implied from the foregoing description. The scope of my invention is limited only by the appended claims.

I claim:

1. In combination with a U-shaped metal stud, an apparatus for holding a vertical length of conduit, cable or pipe firmly against a the flat center portion of said U-shaped metal stud whose center portion contains a series of vertically spaced apart holes, the combination comprising
- a U-shaped metal stud whose flat center portion contains a series of vertically spaced apart holes,
- a helically coiled spring approximately twice the length of the maximum width of the holes in the flat center portion of the stud, and
- a cylindrical retainer of foamed plastic material axially surrounding the coiled spring and having a diameter approximately three times the outside diameter of the coiled spring and a length about one half the length of the coiled spring wherein each end of said helically coiled spring is secured within one of said holes.

2. The combination as set forth in claim 1 in which the helically coiled spring is made of galvanized 18 gauge steel wire and has a length of four inches and an outside diameter of approximately three-eights of an inch.

3. The combination as set forth in claim 1 in which the cylindrical retainer is a hollow tube approximately two inches in length and whose internal diameter is slightly less than the outside diameter of the coiled spring.

4. The combination as set forth in claim 1 in which the retainer is made from a hollow tube of foamed closed cell material called acrylonitrile budiene.

* * * * *